Feb. 22, 1966  R. M. MURDOCK  3,236,389

LAYER CAKE SEPARATOR

Filed Dec. 14, 1964

INVENTOR.
ROBERT M. MURDOCK
BY Elliott & Pastoriza
ATTORNEYS

United States Patent Office 3,236,389
Patented Feb. 22, 1966

3,236,389
LAYER CAKE SEPARATOR
Robert M. Murdock, 711 Adelaide Place,
Santa Monica, Calif.
Filed Dec. 14, 1964, Ser. No. 418,059
4 Claims. (Cl. 211—133)

This invention relates generally to cake accessories and more particularly to an improved layer cake separator particularly useful in wedding cakes and the like in which an aesthetically pleasing, elaborate layer cake structure is to be provided.

In making up wedding cakes and the like, it is common practice to separate normally adjacent layers by a supporting structure, usually of an aesthetically pleasing design, to improve the overall appearance of the cake. It is also customary practice to provide ornamental miniature doll-like structures topping the cake and simulating for example, a bride and groom.

Such devices for separating cake layers as have been provided heretofore are generally of a unitary structure and as a consequence, they make take up considerable room especially when a large number are to be stored. Some devices have been proposed which may be disassembled so that they may be compactly stored or packaged but such devices are not always satisfactory because of difficulty and time consumed in assembling the cake separator. In addition, such collapsible type separators may collapse after being positioned between adjacent layers of a cake with the unhappy result that the cake itself collapses.

Bearing the foregoing in mind, it is a primary object of this invention to provide a greatly improved layer cake separator which overcomes the foregoing problems.

More particularly, it is an object to provide a layer cake separator which incorporates unique locking elements so that the separator may be assembled from a collapsed state to a rigid structure without risk of same inadvertently collapsing and in which such assembly may be carried out in a minimum of time.

Other objects and advantages of this invention reside in the provision of a unique separator design enabling collapsing in which the components making up the structure are all integral, there being no small parts necessary for securing the structure when assembling the same, all to the end advantage that the risk of losing certain components is minimized.

Briefly, these and many other objects and advanatges of this invention are realized by providing first and second flat members together with a plurality of columns adapted to be disposed between the members to hold them in spaced parallel relationship. The arrangement is such that when the members and columns are properly assembled, the members may be disposed between layers of a cake to support one layer at a given distance above another layer and thus provide the desired aesthetic appearance of the overall cake.

In accordance with important features of this invention, the members include receiving means disposed in opposing relationship for receiving opposite ends of the columns, the columns themselves including locking means at their opposite ends co-operating with the receiving means in such a manner that only a single rotation of each column is necessary to effect simultaneous locking of its opposite ends to the two members. The arrangement is such that the members and columns may be very quickly assembled and once assembled are secure in position. Similarly, the separator may be very quickly disassembled and the same thus stored in compact condition or packaged in a compact state for easy shipping.

A better understanding of the invention will be had by now referring to a preferred embodiment thereof as illustrated in the accompanying drawings in which.

Figure 1:
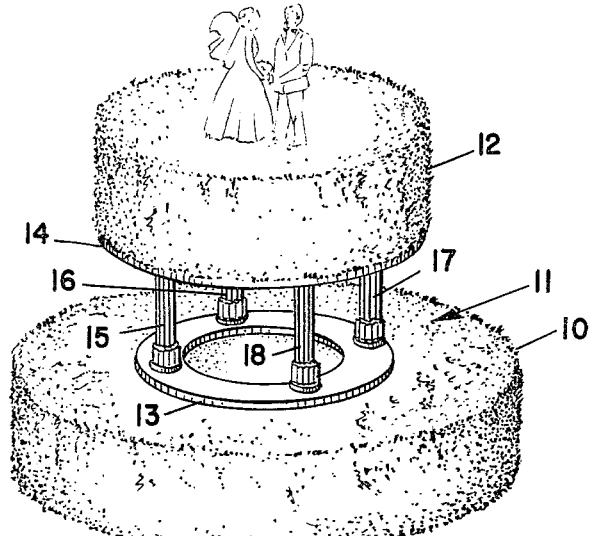
FIGURE 1 is a perspective view of a wedding cake incorporating the improved cake separator of this invention.

Referring first to FIGURE 1, there is shown a wedding cake including a bottom layer 10, the layer separator of this invention designated generally by the numeral 11, and a top layer 12 supported on the separator in spaced relationship to the bottom layer. There may be provided miniature doll-like structures simulating a bride and groom atop the layer 12 as shown. The separator itself includes first and second flat members which may be of any desired shape but as shown in the preferred embodiment, constitute a flat ring 13 forming a bottom member and a flat disk 14 forming a top member. Shown disposed between these members are a plurality of columns 15, 16, 17, and 18 supporting the members in spaced parallel relationship.

The members and columns incorporate unique removable locking means enabling rapid assembly and disassembly of the members and columns so that the structure may be easily collapsed or assembled. In principle, the means for securing the columns to the members are all identical and therefore detailed description of one such means will suffice for all.

Figure 2:
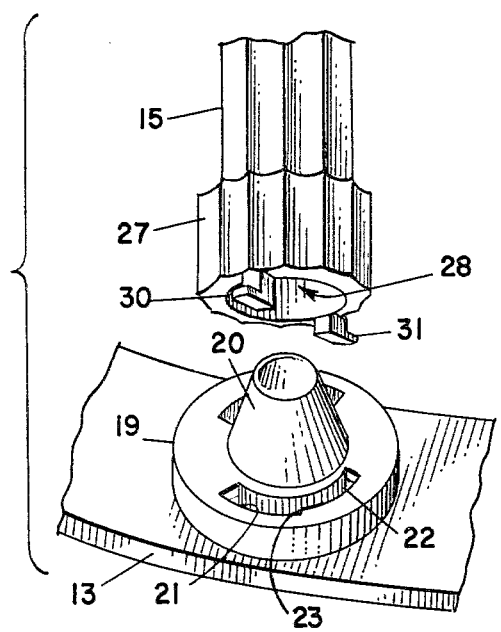
FIGURE 2 is an enlarged fragmentary exploded perspective view of the unique receiving and locking means for enabling rapid assembly of the structure.

Thus, referring to FIGURE 2, by way of example, there is shown in exploded view a portion of the ring bottom member 13 preparatory to having the lower end portion of the column 15 secured thereto. As shown, the top surface of the ring 13 includes a receiving means in the form of a base 19 having a frusto-conical projection 20 extending upwardly therefrom. Adjacent the base area of the frusto-conical portion 20 there is provided at least one slot indicated at 21 and including an arcuate portion of relatively wide width narrowing into a narrowed slot portion 22 thereby defining a shoulder 23.

Figure 3:
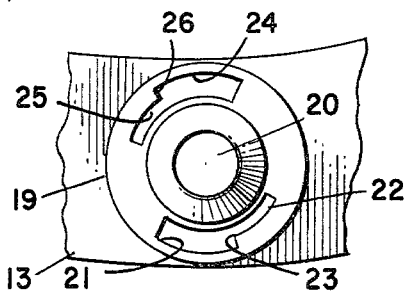
FIGURE 3 is a fragmentary plan view of one of the receiving means on one of the members of FIGURE 1.

A similar slot is preferable provided on the diametrically opposed side of the frusto-conical projection as illustrated in FIGURE 3 at 24. As in the case of the first described arcuate slot, the slot 24 narrows into a narrowed slot portion 25 to define a shoulder 26.

Referring once again to FIGURE 2, one end of the column 15 includes an enlarged portion 27 having a hollow interior 28 adapted to receive the frusto-conical projection 20. The enlarged end 27 also includes locking means in the form of integrally extending legs terminating in laterally extending tabs 30 and 31. These tabs are positioned adjacent the periphery of the enlarged portion 27 so as to be received within the enlarged slot portions 21 and 24 respectively when the column 15 is positioned over the receiving means. Thus, the lateral extent of the tabs 30 and 31 is less than the width of the large slots but is made greater than the narrowed slot portions.

With the foregoing arrangement in mind, it will be evident that in securing the lower end of the column 15 to the lower member 13, the frusto-conical portion 20 is received within the hollow interior 28 and simultaneously the tabs 30 and 31 are received through the enlarged slots 21 and 24 respectively. The column 15 may then simply be rotated approximately a quarter turn in a counterclockwise direction when viewed from above as in FIGURE 3 to cause the tabs 30 and 31 respectively to pass beneath the shoulders 23 and 26 thereby locking the column to the lower member 13.

The opposite ends of each of the columns such as the column 15 terminate in enlarged portions corresponding to the portion 27 and also terminate in laterally extending tabs, the structure being identical to that described in conjunction with FIGURE 2. These upper tabs are in vertical alignment with the lower tabs.

Figure 4:
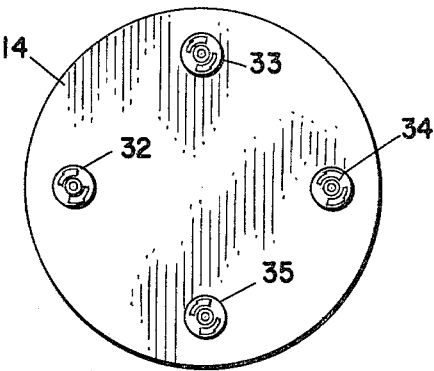
FIGURE 4 is an underside plan view of the receiving means for securing part of the components on the other of the members illustrated in FIGURE 1.

In a similar manner, the upper or second member 14 includes on its underside receiving means such as illustrated in FIGURE 4 at 32, 33, 34, and 35. These receiving means include frusto-conical portions and are each identical to the structures described with respect to FIGURES 2 and 3 with the exception that the slot structures constitute mirror images of the slot structures shown in FIGURES 2 and 3. By providing the slot structures as mirror images of each other, the single rotation of the column 15 when the respective lower and upper lateral tabs have been received in the slots will suffice to lock the opposite ends of the column simultaneously to the low and upper members.

In the actual operation of assembling the separator, the lower member in the form of the ring 13 is positioned on a flat surface and the four columns 15, 16, 17 and 18 very readily positioned over the frusto-conical portions of the receiving means with the tabs 30 and 31 passing through the enlarged slot portions. In such positions the upper tabs on the various columns will be properly aligned to be received in the corresponding enlarged slot portions in the upper receiving means described in FIGURE 4. With the upper member resting on top of the columns, each of the columns may then be given a quarter turn to effect simultaneous locking of their lower and upper ends to their respective members.

The entire structure may then be positioned on the layer 10 of the cake illustrated in FIGURE 1 and then the next layer 12 positioned on the top disk member 14.

Disassembly of the structure is equally as simple. Thus, the separator is removed from between the cake layers and each of the columns rotated in a clockwise direction a quarter turn. It is then a simple matter to lift the upper member 14 from the top ends of the columns and pull the columns free of the lower member.

The manufacture of the cake separator is greatly simplified in view of the symmetry of each of the columns wherein opposite ends are identical in construction. Similarly, each of the members may be integrally formed, preferably from plastic material, the receiving means for each member being all identical with the understanding that the slot structures in the upper member receiving means are mirror images of the slot structures in the lower member receiving means so that the simultaneous locking of the opposite ends of each column can be carried out.

From the foregoing description, it will accordingly be evident that the present invention has provided a greatly improved layer cake separator in which the various objects and advantages referred to heretofor have been fully realized.

While only one particular embodiment of the invention has been set forth and described, various changes that fall clearly within the scope and the spirit of the invention will occur to those skilled in the art. The layer cake separator is therefore not to be thought of as limited to the particular embodiment set forth merely for illustrative purposes.

What is claimed is:

1. A layer cake separator comprising, in combination: a pair of members, said members including opposed aligned slots which are mirror images of each other; at least one elongated spacing means disposed between said members to hold said members in spaced relationship so that the members may be disposed between layers of a cake to support one layer above another, said elongated spacing means having locking means at its opposite ends for removably securing said elongated spacing means in position between said members, said locking means including tab means receivable in said slots and adapted to be locked under edge portions of said slots simultaneously upon a single rotation of said elongated spacing means after positioning said tabs through said slots.

2. A layer cake separator comprising, in combination: first and second flat members; and a plurality of columns disposed between said members to support the members in spaced, parallel relationship so that the members may be disposed between layers of a cake to support one layer above another, said members having mirror image slot means on their opposed surfaces for receiving the ends of said columns; and said columns having integral locking means at their opposite ends for co-operating with said receiving slot means to removably secure said columns in position between said members simultaneously upon a single rotation of said columns after positioning said locking means within said slot means.

3. A layer cake separator comprising, in combination: first and second flat members; a plurality of columns disposed between said members to support the members in spaced, parallel relationship so that the members may be disposed between layers of a cake to support one layer above another, said members having receiving means on their opposed surfaces for receiving the ends of said columns; said columns having locking means at their opposite ends for cooperating with said receiving means to removably secure said columns in position between said members, each of said receiving means comprising a raised frusto-conical projection, the base area immediately surrounding said projection having at least one arcuate slot formed therein, said slot having a given width over a portion of its arc, said width then decreasing to define a narrower slot width over its remaining portion; each of said columns having hollow end portions for receiving the frusto-conical projections and including at a peripheral portion at least one extending element having a lateral tab defining said locking means, said lateral tab extending a distance less than said given width of said arcuate slot and greater than said narrower slot width whereby rotation of a column after having its end receive a frusto-conical projection and its extending element received through a portion of the slot of given width, moves said tab beneath said narrower slot width remaining portion to lock the end of the column to the member.

4. A separator according to claim 3, in which the tabs on the opposite ends of any one column are in alignment with each other and the arcuate slots on said members opposing each other for receiving the opposite tabs of any one column are mirror images of each other so that both ends of one column are locked simultaneously to said members upon a single rotation of the column.

References Cited by the Examiner

UNITED STATES PATENTS

| | | | |
|---|---|---|---|
| 949,025 | 2/1910 | Matthews | 108—153 |
| 2,178,166 | 10/1939 | Enstrom | 108—101 |
| 2,347,041 | 4/1944 | Filsinger | 211—133 |
| 2,902,174 | 9/1959 | Audsley | 108—101 |
| 2,921,691 | 1/1960 | Dembinsky | 108—101 |
| 2,973,871 | 3/1961 | Wukowitz | 108—101 |
| 3,115,253 | 12/1963 | Malbin et al. | 211—128 |

FRANK B. SHERRY, *Primary Examiner.*

J. T. McCALL, *Assistant Examiner.*